United States Patent
Hou et al.

(10) Patent No.: US 10,116,781 B2
(45) Date of Patent: Oct. 30, 2018

(54) METHOD, DEVICE AND COMPUTER-READABLE MEDIUM FOR CONTROLLING A DEVICE

(71) Applicant: Xiaomi Inc., Haidian District, Beijing (CN)

(72) Inventors: Enxing Hou, Beijing (CN); Yue Liang, Beijing (CN); Meilan Liu, Beijing (CN)

(73) Assignee: XIAOMI INC., Beijing (CN)

(*) Notice: Subject to any disclaimer, the term of this patent is extended or adjusted under 35 U.S.C. 154(b) by 16 days.

(21) Appl. No.: 15/369,858

(22) Filed: Dec. 5, 2016

(65) Prior Publication Data

US 2017/0180531 A1 Jun. 22, 2017

(51) Int. Cl.
| | |
|---|---|
| *H04M 1/67* | (2006.01) |
| *G06F 21/36* | (2013.01) |
| *H04M 1/673* | (2006.01) |
| *H04M 1/725* | (2006.01) |
| *H04W 12/06* | (2009.01) |
| *H04W 4/70* | (2018.01) |
| *H04L 12/28* | (2006.01) |
| *H04W 88/02* | (2009.01) |
| *H04L 12/931* | (2013.01) |

(52) U.S. Cl.
CPC ............ *H04M 1/673* (2013.01); *G06F 21/36* (2013.01); *H04M 1/72533* (2013.01); *H04W 12/06* (2013.01); *H04L 12/2803* (2013.01); *H04L 12/2816* (2013.01); *H04L 49/351* (2013.01); *H04W 4/70* (2018.02); *H04W 88/02* (2013.01)

(58) Field of Classification Search
CPC . H04M 1/673; H04M 1/72533; H04L 49/351; H04W 88/02; H04W 12/06; H04W 4/70; G06F 21/36
See application file for complete search history.

(56) References Cited

U.S. PATENT DOCUMENTS

| | | | |
|---|---|---|---|
| 9,454,251 B1* | 9/2016 | Guihot | .................. G08C 17/02 |
| 2012/0331156 A1 | 12/2012 | Colpitts et al. | |
| 2017/0134553 A1* | 5/2017 | Jeon | .................... G06F 3/04842 |

FOREIGN PATENT DOCUMENTS

| | | |
|---|---|---|
| CN | 104503688 A | 4/2015 |
| CN | 104714414 A | 6/2015 |

(Continued)

OTHER PUBLICATIONS

Extended European Search Report of European Application No. 16202600.9.
International Search Report of PCT/CN2016/096643.

*Primary Examiner* — Marisol Figueroa
(74) *Attorney, Agent, or Firm* — Jun He Law Offices P.C.; James J. Zhu

(57) ABSTRACT

A method, device and computer-readable medium for controlling a device are provided. The method includes: receiving an identifier display instruction, the identifier displaying instruction being generated when a lock screen of the control device is touched along a predetermined path; acquiring a device identifier of a corresponding controlled device according to log-in status of a user account on the control device; displaying the acquired device identifier of each controlled device on the lock screen; transmitting a control instruction to a controlled device corresponding to a selected device identifier after the selected device identifier is determined.

17 Claims, 8 Drawing Sheets

(56) References Cited

FOREIGN PATENT DOCUMENTS

| | | | |
|---|---|---|---|
| CN | 105162971 | A | 12/2015 |
| CN | 105611045 | A | 5/2016 |
| WO | 2014210304 | A1 | 12/2014 |

\* cited by examiner

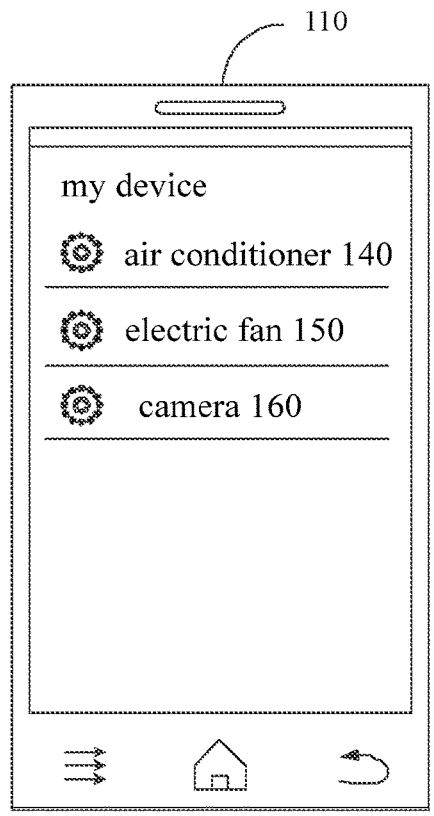

FIG. 3C

| displaying the acquired each device identifier on the lock screen if only the device identifier fed back by the router is received | 303a |
| --- | --- |
| Displaying the each device identifier acquired from the router and the cloud sever on the lock screen, the displayed each device identifier being different from each other if the device identifier fed back by the router and the device identifier fed back by the cloud sever are received | 303b |

| displaying the each device identifier acquired from the cloud sever in a first group | 303b1 |
| --- | --- |
| displaying the device identifier acquired from the router and not displayed in the first group in a second group, the first group being different from the second group | 303b2 |

FIG. 3E

METHOD, DEVICE AND COMPUTER-READABLE MEDIUM FOR CONTROLLING A DEVICE

CROSS-REFERENCE TO RELATED APPLICATION

This application is based on and claims priority to Chinese Patent Application No. 201510947427.7 filed on Dec. 17, 2015, which is incorporated herein by reference in its entirety.

FIELD

The present disclosure generally relates to the technical field of a smart home, and more particularly to a method, a device and computer-readable medium for controlling a device.

BACKGROUND

A smart home may be configured with a plurality of smart devices, and a user may directly control these smart devices via a handheld smart terminal. Usually, the smart terminal may be denoted as a control device, and the smart device which will be controlled may be denoted as a controlled device.

The user usually may set a lock password on the control device in consideration of misoperation prevention and information security. If the control device is not operated during a preset time, the control device may automatically enter into lock status. When the user wants to use the control device to control the controlled device, the user should input the lock password to enter a control interface. If the user controls the controlled device frequently when the control device is in the lock status, the steps of unlocking and performing control may be relatively complicated.

SUMMARY

According to a first aspect of the embodiments of the present disclosure, a method for controlling a device is provided. The method may be applied to a control device and include: receiving an identifier display instruction, the identifier displaying instruction being generated when a lock screen of the control device is touched along a predetermined path; acquiring a device identifier of a corresponding controlled device according to log-in status of a user account on the control device; displaying the acquired device identifier of each controlled device on the lock screen; transmitting a control instruction to a controlled device corresponding to the device identifier after a selected device identifier is determined.

According to a third aspect of the embodiments of the present disclosure, a device for controlling a device is provided. The device may be applied to a control device and include: a processor; a memory for storing processor-executable instructions; wherein the processor is configured to: receive an identifier display instruction, the identifier displaying instruction being generated when a lock screen of the control device is touched along a predetermined path; acquire a device identifier of a corresponding controlled device according to log-in status of a user account on the control device; display the acquired device identifier of each controlled device on the lock screen; transmit a control instruction to a controlled device corresponding to the device identifier after a selected device identifier is determined.

According to a third aspect of the embodiments of the present disclosure, a computer-readable medium is provided, the computer-readable medium being readable by a computer and having recorded thereon a computer program including instructions for executing the steps of a method for controlling a device. The method includes: receiving an identifier display instruction, the identifier displaying instruction being generated when a lock screen of the control device is touched along a predetermined path; acquiring a device identifier of a corresponding controlled device according to log-in status of a user account on the control device; displaying the acquired device identifier of each controlled device on the lock screen; transmitting a control instruction to a controlled device corresponding to the device identifier after a selected device identifier is determined.

It is to be understood that the forgoing general description and the following detailed description are illustrative only, and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 3C is a schematic diagram for the control device displaying the device identifier on the lock screen.

FIG. 3D is a flow diagram illustrating two methods of the control device acquiring the controlled device from the network device according to an exemplary embodiment.

FIG. 3E is a flow diagram illustrating a method of the control device displaying the device identifier of the controlled device in different groups according to an exemplary embodiment.

DETAILED DESCRIPTION

Reference will now be made in detail to example embodiments, examples of which are illustrated in the accompanying drawings. The following description refers to the accompanying drawings in which same numbers in different drawings represent same or similar elements unless otherwise described. The implementations set forth in the following description of example embodiments do not represent all implementations consistent with the present disclosure. Instead, they are merely examples of devices and methods consistent with aspects related to the present disclosure as recited in the appended claims.

Figure 1:
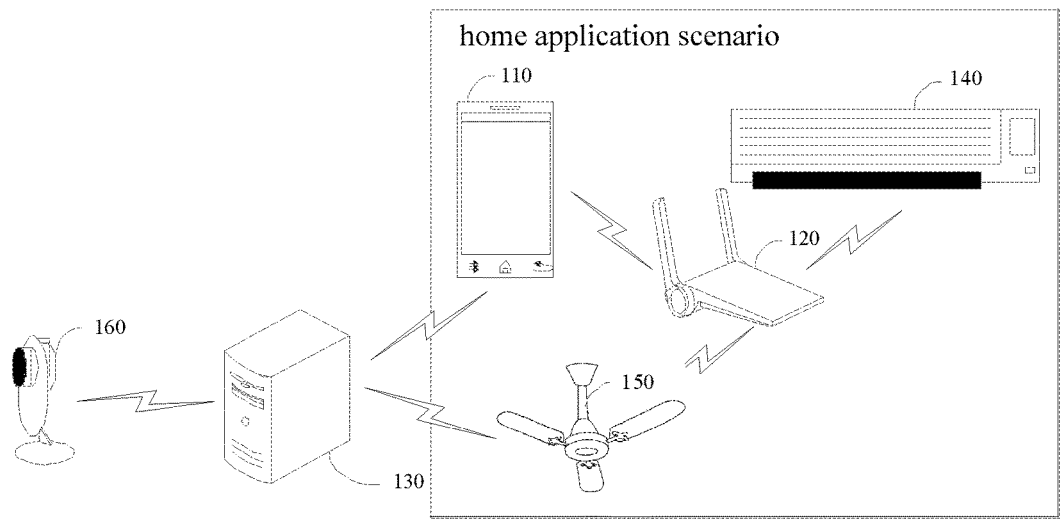
FIG. 1 is a schematic diagram illustrating an environment within which a method for controlling a device is implemented according to exemplary embodiments.

FIG. 1 is a schematic diagram illustrating an implementing environment related to a method for controlling a device according to partial exemplary embodiments. As shown in FIG. 1, the implementing environment may include a control device 110, a router 120, and a cloud server 130.

The control device 110 may be a smart phone, a tablet, a smart TV, a portable laptop computer, a desktop computer and the like.

The control device 110 may establish a connection with the router 120 and the cloud server 130 respectively via a wireless network.

The implementing environment may further include a controlled device such as a controlled device 140 and a controlled device 150 in FIG. 1. The controlled device may be in a same local area network with the control device 110, and in this case, the controlled device may be connected with the router 120. Also, the controlled device may not be in the same local area network with the control device 110, and in this case, the controlled device may usually connect with the control device 110 with the cloud server 130.

Figure 2:
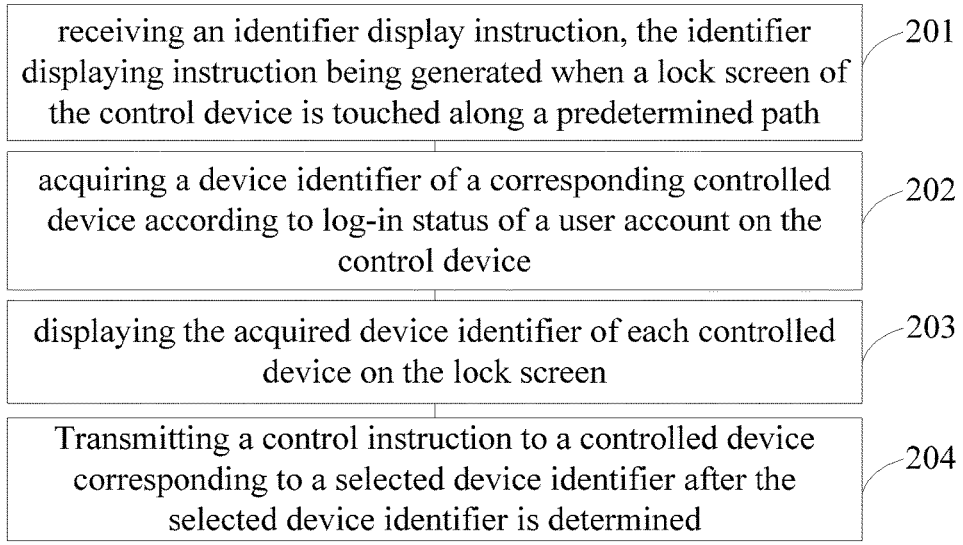
FIG. 2 is a flow diagram illustrating a method for controlling a device according to an exemplary embodiment.

FIG. 2 is a flow diagram illustrating a method for controlling a device according to an exemplary embodiment. As shown in FIG. 2, the method for controlling a device may be applied into the control device 110 in the implementing environment shown in FIG. 1, the method for controlling a device may include the following steps.

In step 201, an identifier display instruction may be received, and the identifier displaying instruction may be generated when a lock screen of the control device is touched along a predetermined path.

In step 202, a device identifier of a corresponding controlled device may be acquired according to log-in status of a user account on the control device.

In step 203, the acquired device identifier of each controlled device may be displayed on the lock screen.

In step 204, after a selected device identifier is determined, a control instruction may be transmitted to a controlled device corresponding to the selected device identifier.

In the embodiment, the method for controlling a device may receive the identifier display instruction via the lock screen of the control device, display the acquired device identifier of each controlled device on the lock screen, and transmit the control instruction to the controlled device corresponding to the selected device identifier after the selected device identifier is determined. Since the user may control the controlled device directly in the lock screen without unlocking the control device, the user may avoid controlling the controlled device frequently when the control device is in the lock status. The user can control the controlled device directly in the lock screen without unlocking the control device, and, accordingly, the timeliness and convenience of the user controlling the controlled device are improved.

Figure 3A:
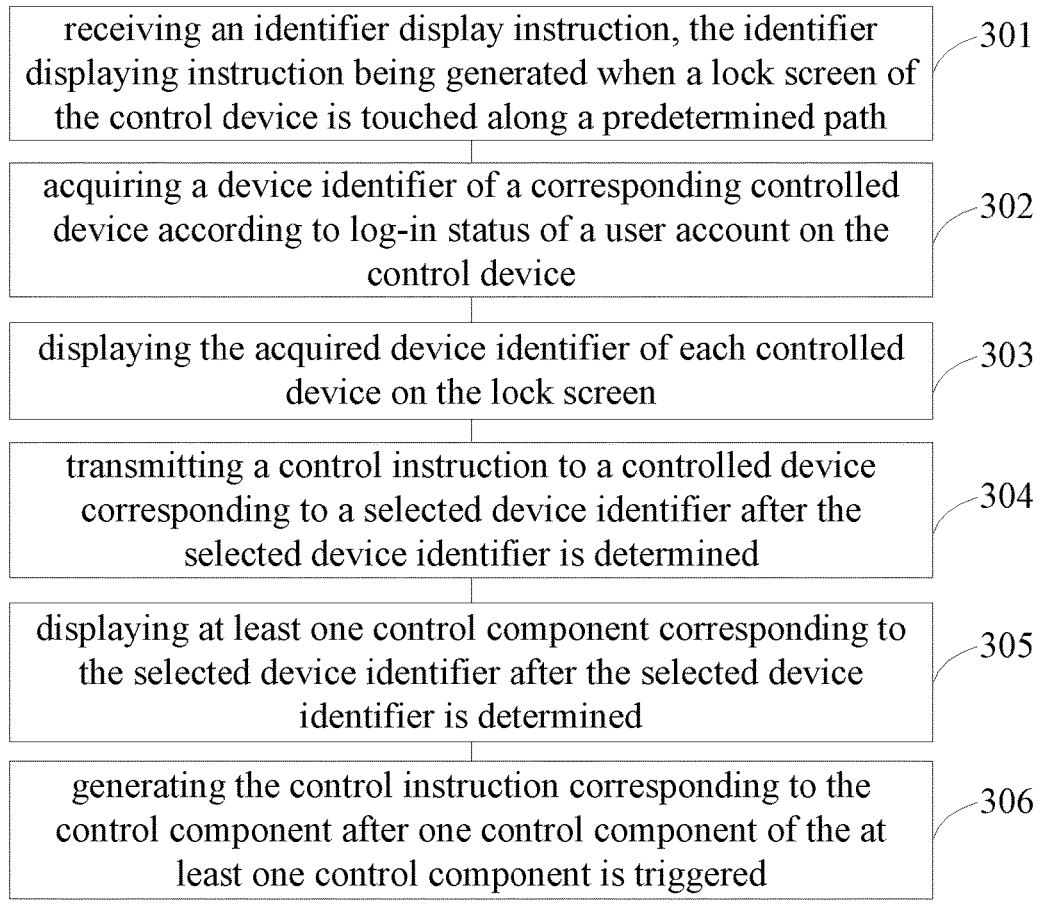
FIG. 3A is a flow diagram illustrating a method for controlling a device according to another exemplary embodiment.

FIG. 3A is a flow diagram illustrating a method for controlling a device according to another exemplary embodiment. As shown in FIG. 3A, the method for controlling a device may be applied into the control device 110 in the implementing environment shown in FIG. 1, and the method may include the following steps.

In step 301, an identifier display instruction may be received, and the identifier displaying instruction may be generated when a lock screen of the control device is touched along a predetermined path.

The control device may acquire the device identifier of the controlled device via receiving the identifier display instruction generated when the user touches the lock screen along the predetermined path.

Optionally, the identifier displaying instruction may be generated when a predetermined area on the lock screen of the control device is touched along the predetermined path.

Optionally, the identifier displaying instruction may be received when the control device is in the lock status.

In step 302, a device identifier of a corresponding controlled device may be acquired according to log-in status of a user account on the control device.

The log-in status described herein may refer to whether the user account bound to the control device is logged-in on the cloud server, namely whether the control device is connected with the cloud server. If the log-in status of the user account on the control device is online, it means that the control device has connected with the cloud server. Therefore, when the log-in status of the user account on the control device is online, the control device may acquire the device identifier of the controlled device bound to the user account in the cloud server via the wireless network.

Figure 3B:
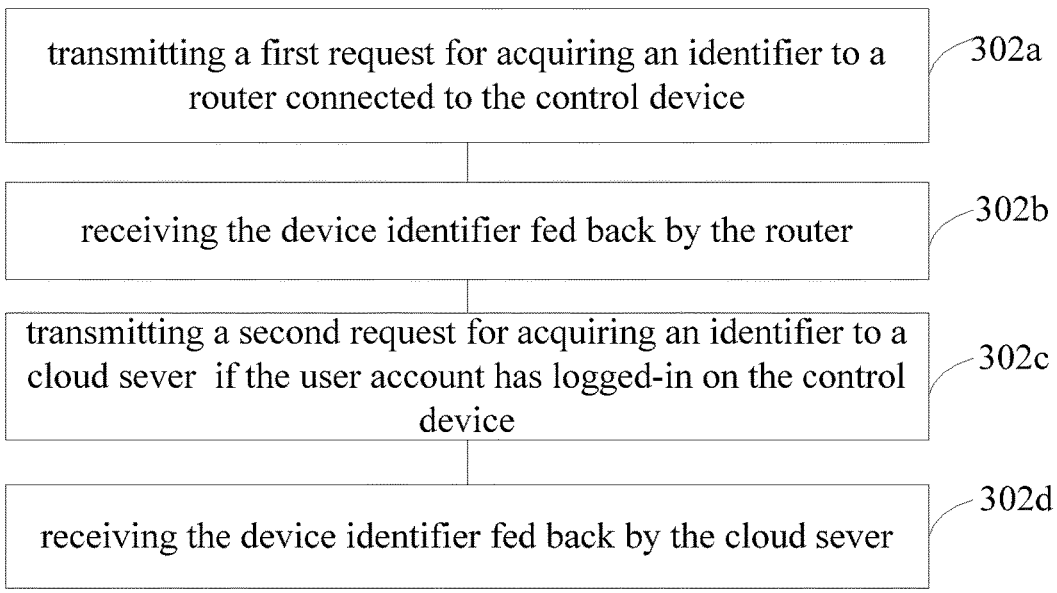
FIG. 3B is a flow diagram illustrating two methods for acquiring the device identifier of the controlled device according to an exemplary embodiment.

In a possible implementation, the control device may acquire the device identifier of the controlled device bound to the user account from the cloud server, and may acquire the device identifier of the controlled device connected with the router from the connected router. FIG. 3B is a flow diagram illustrating two methods for acquiring the device identifier of the controlled device according to an exemplary embodiment. As shown in FIG. 3B, the two methods for acquiring the device identifier of the controlled device may include the following steps.

In step 302a, a first request for acquiring an identifier may be transmitted to the router connected to the control device, and the first request for acquiring an identifier may be used to trigger the router to feed back a device identifier of each controlled device connected to the router.

After receiving the first request for acquiring an identifier transmitted by the control device, the router connected with the control device may query the device identifier of the controlled device currently connected with the router and feed back the queried device identifier of the controlled device to the control device.

In step 302b, the device identifier fed back by the router may be received.

Since the control device is connected with the router and the router is connected with the controlled device, the device identifier of the controlled device acquired by control device from the connected router may be the device identifier of the controlled device which is in the same local area network with the control device. The controlled device bound to the user account which is bound to the control device may possibly exist in the controlled device connected with the router, and in this case, the controlled device may be in the same local area network with the control device bound to the user account. Therefore, when the controlled device bound to the user account is in the same local area network with the control device, even if the control device is not connected with the cloud server, the control device may acquire the device identifier of the controlled device bound to the user account by receiving the device identifier fed back by the router.

Referring to FIG. 1, the router 120 may connect with the control device 110, an electric fan 150, and an air conditioner 140 respectively via the wireless network, wherein, the electric fan 150 may be the controlled device bound, via the cloud server 130, to the user account which is bound to the control device 110. After the control device 110 transmitted the first request for acquiring an identifier to the router 120, the router 120 may feed back the device identifiers of the electric fan 150 and the air conditioner 140 to the control device 110.

In step 302c, if the user account has logged-in on the control device, a second request for acquiring an identifier may be transmitted to the cloud sever.

After the user account logged-in on the control device successfully, the control device may transmit the second request for acquiring an identifier to the cloud server. The second request for acquiring an identifier may be used to trigger the cloud sever to feed back a device identifier of each controlled device bound to the user account.

After receiving the second request for acquiring an identifier transmitted by the control device, the cloud server may query the device identifier of the controlled device bound to the user account and feed back the queried device identifier of the controlled device to the control device.

In step 302d, the device identifier fed back by the cloud sever may be received.

Referring to FIG. 1, the cloud server 130 may connect with the control device 110, the electric fan 150, and a camera 160 respectively via the wireless network, wherein, the electric fan 150 and the camera 160 may be the controlled device bound, via the cloud server 130, to the user account which is bound to the control device 110. After the user account logged-in on the control device 110 and the control device 110 transmitted the second request for acquiring an identifier to the cloud server 130, the cloud server 130 may feed back the device identifiers of the electric fan 150 and the camera 160 to the control device 110.

In step 303, the acquired device identifier of each controlled device may be displayed on the lock screen.

After the control device received the device identifier of each controlled device fed back by the cloud server or the router, the device identifier of each controlled device may be directly displayed on the lock screen. FIG. 3C is a schematic diagram for the control device displaying the device identifier on the lock screen. As shown in FIG. 3C, the device identifier of each controlled device may be displayed on the lock screen of the control device 110.

In a possible implementation, since the controlled device acquired by the control device may include the controlled device bound to the user account, that is, when the control device acquire the controlled device from the router and the cloud server, the acquired controlled device may be repeated. Therefore, when the control device acquires the controlled device from the router and the cloud server, it is desired to perform a duplication removing operation to the acquired same controlled devices and retain one of them. FIG. 3D is a flow diagram illustrating two methods of the control device acquiring the controlled device from the network device according to an exemplary embodiment. As shown in FIG. 3D, there may be two methods of the control device acquiring the controlled device from the network device, which are as follows.

In step 303a, if only the device identifier fed back by the router is received, the acquired each device identifier may be displayed on the lock screen.

In step 303b, if the device identifier fed back by the router and the device identifier fed back by the cloud sever are received, the each device identifier acquired from the router and the cloud sever may be displayed on the lock screen, and the displayed each device identifier may be different from each other.

If the control device only receives the device identifier fed back by the router, the received each device identifier may be directly displayed.

If the control device receives the device identifier fed back by the router and the device identifier fed back by the cloud sever, the control device may acquire the controlled device bound to the user account and located in the same local area network from the router. Therefore, after the control device acquired the device identifier fed back by the router and the cloud server, it is desired to perform the duplication removing operation to the controlled device bound to the user account. Namely, when performing the duplication removing operation to the same device identifiers, only one of them may be retained, and other device identifiers which are the same with the device identifier may be deleted.

In a possible implementation, the control device may display the each device identifier acquired from the router and the cloud sever in different groups so as to facilitate the user to distinguish the acquisition way of the each device identifier. FIG. 3E is a flow diagram illustrating a method of the control device displaying the device identifier of the controlled device in different groups according to an exemplary embodiment. As shown in FIG. 3E, the method of the control device displaying the device identifier of the controlled device in different groups may be implemented by the following step 303b1 to step 303b2.

In step 303b1, the each device identifier acquired from the cloud sever may be displayed in a first group.

In step 303b2, the device identifier acquired from the router and not displayed in the first group may be displayed in a second group, and the first group may be different from the second group.

Figure 3F:
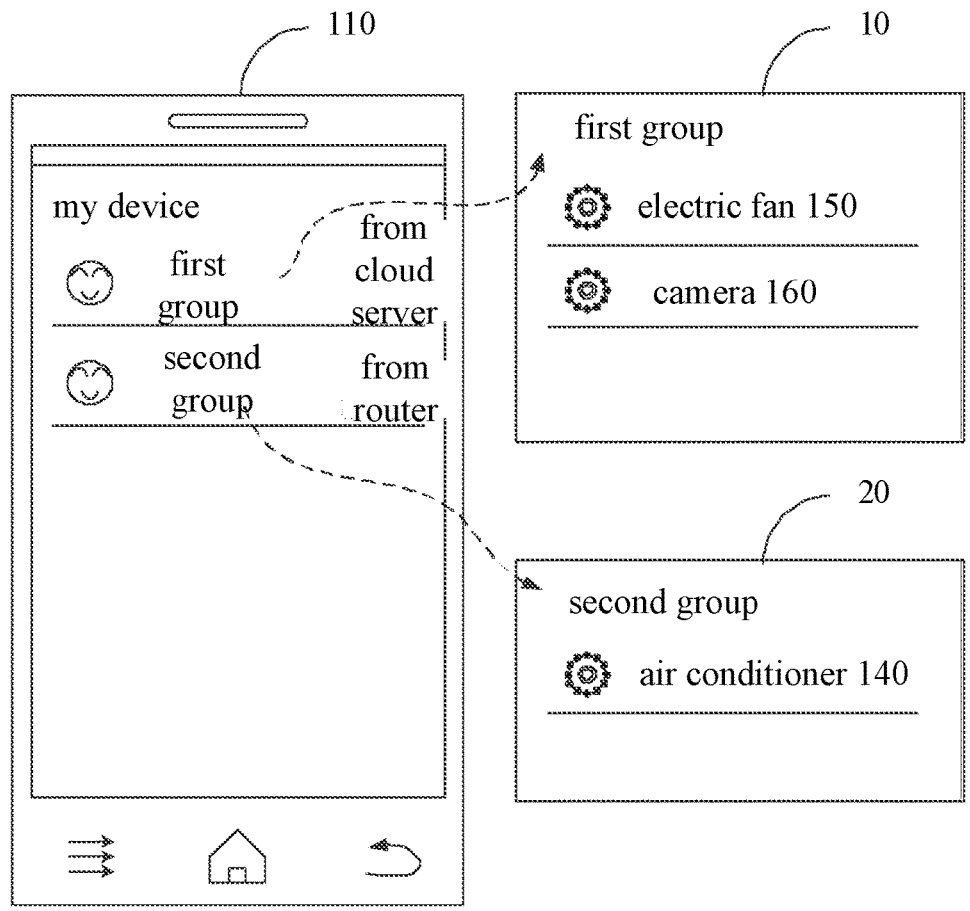
FIG. 3F is a schematic diagram illustrating that the control device displays the device identifier in different groups according to an exemplary embodiment.

Referring to FIG. 1, the router 120 may connect with the control device 110, the electric fan 150, and the air conditioner 140 respectively via the wireless network, and the cloud server 130 may connect with the control device 110, the electric fan 150, and the camera 160 respectively via the wireless network. FIG. 3F is a schematic diagram illustrating that the control device displays the device identifier in different groups according to an exemplary embodiment. As shown in FIG. 3F, after the control device 110 acquired the electric fan 150 and the camera 160 from the cloud server 130, the control device may display the device identifiers of the electric fan 150 and the camera 160 in the first group 10 on the lock screen. After the control device 110 acquired the electric fan 150 and the air conditioner 140 from the router 120, and since the device identifier of the electric fan 150 has been displayed in the first group, the control device may only display the device identifier of the air conditioner 140 in the second group 20 so as to guarantee the device identifiers displayed in the first group and the second group are different.

In step 304, after a selected device identifier is determined, a control instruction may be transmitted to a controlled device corresponding to the selected device identifier.

When the control component of the controlled device displayed on the lock screen of the control device is triggered, the control device may transmit the control instruction generated by the control component to the controlled device so as to control the controlled device.

Figure 3G:
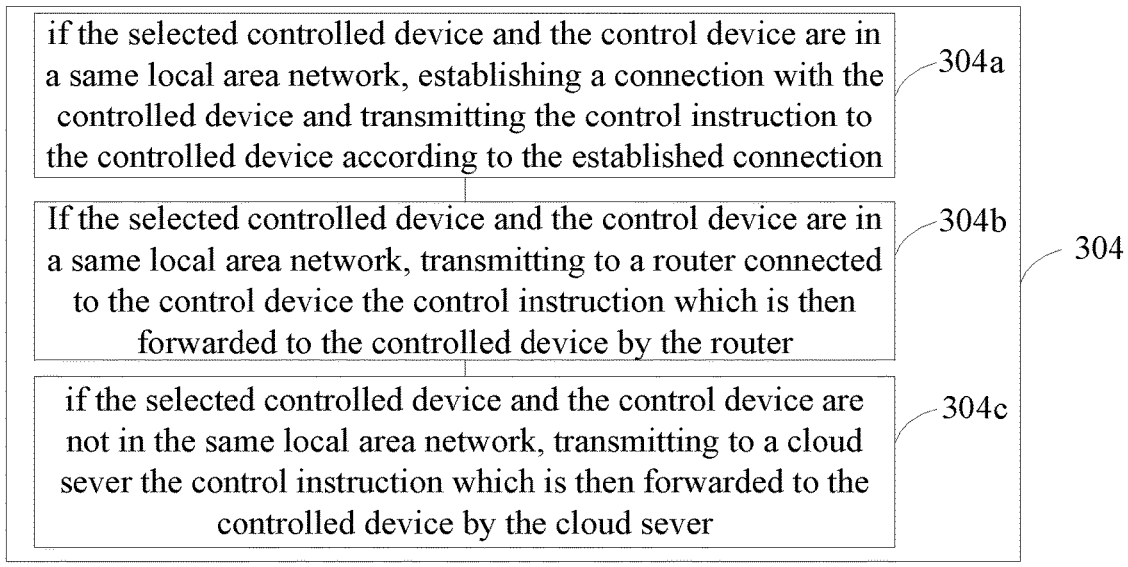
FIG. 3G is a flow diagram illustrating three methods of the control device transmitting the control instruction according to an exemplary embodiment.

In a possible implementation, before transmitting the control instruction to the selected controlled device, the control device should determine whether the controlled device is in the same local area network with the control device so as to select the transmitting path of the control instruction. FIG. 3G is a flow diagram illustrating three methods of the control device transmitting the control instruction according to an exemplary embodiment. As shown in FIG. 3G the three methods of the control device transmitting the control instruction may be as follows.

In step 304a, if the selected controlled device and the control device are in the same local area network, a connection may be established with the controlled device and the control instruction may be transmitted to the controlled device according to the established connection.

In step 304b, if the selected controlled device and the control device are in the same local area network, the control instruction may be transmitted to the router connected to the control device, and the control instruction may be then forwarded to the controlled device by the router.

When the selected controlled device and the control device are in a same local area network, the control device may directly establish a connection with the controlled device and transmit the control instruction to the controlled device.

Since the selected controlled device and the control device are in a same local area network, namely the router connected to the control device may also connect to the controlled device, the control device may transmit the control instruction to the router connected to the control device, and the router may then forward the control instruction to the controlled device.

In step 304c, if the selected controlled device and the control device are not in the same local area network, the control instruction may be transmitted to the cloud sever, and the control instruction may be then forwarded to the controlled device by the cloud sever.

When the selected controlled device and the control device are not in the same local area network, and since the cloud server connected to the control device may also connect to the controlled device, the control instruction transmitted by the control device to the controlled device may be forwarded by the cloud server.

In step 305, after the selected device identifier is determined, at least one control component corresponding to the selected device identifier may be displayed.

Figure 3H:
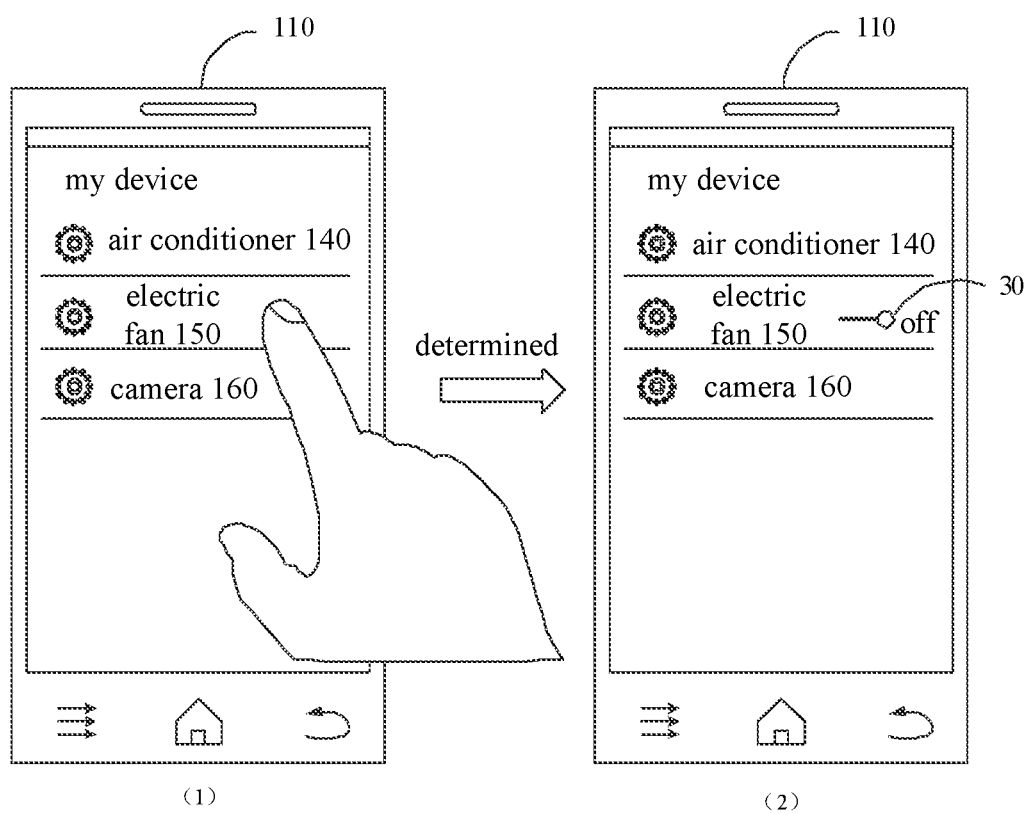
FIG. 3H is a schematic diagram illustrating the control component corresponding to the device identifier according to an exemplary embodiment.

Referring to FIG. 3H, FIG. 3H is a schematic diagram illustrating the control component corresponding to the device identifier according to an exemplary embodiment. As shown in FIG. 3H(1), when the user determines the device identifier "electric fan 150" to be controlled, the control device 110 may receive a determination instruction of the user, and the determination instruction may be triggered by the touch action of the user. As shown in FIG. 3H(2), the control device may display, after receiving the determination instruction of the user, the control component "turn on/off" 30 corresponding to the electric fan 150 after the device identifier "electric fan 150" on the lock screen. The user may control the electric fan 150 via triggering the control component "turn on/off" 30.

In step 306, after one control component of the at least one control component is triggered, the control instruction corresponding to the control component may be generated.

As shown in FIG. 3H(2), the electric fan 150 is in close status, and when the control component "turn on/off" 30 corresponding to the electric fan 150 is triggered, the control device may generate a turn on instruction.

Figure 3I:
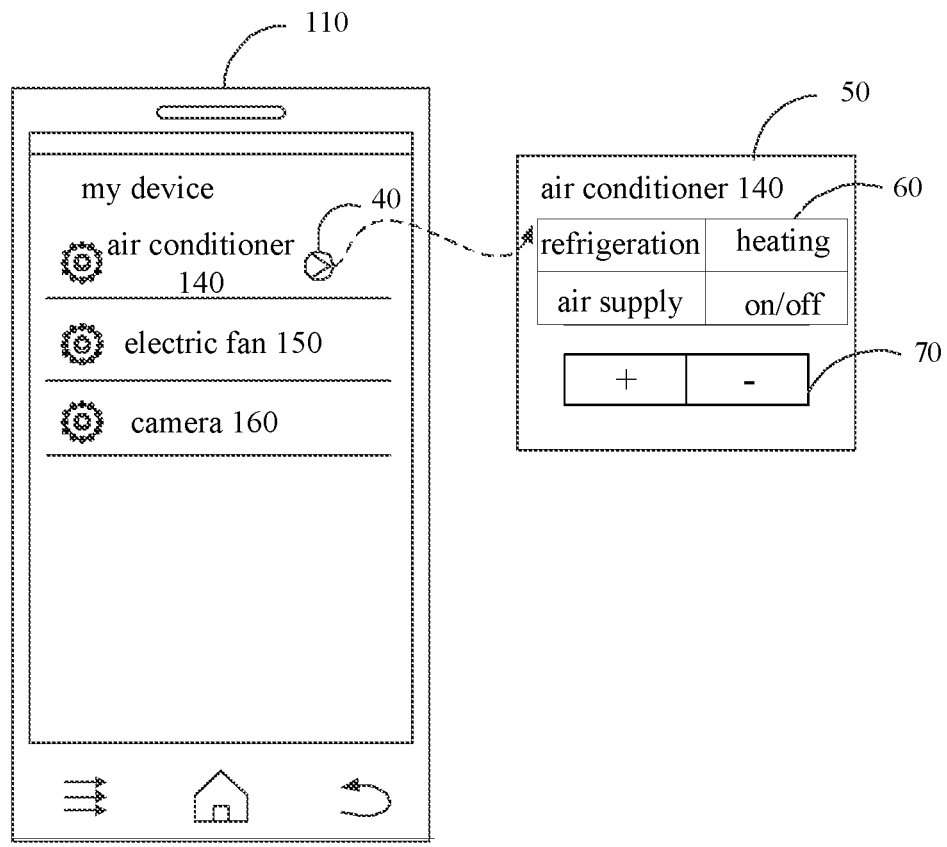
FIG. 3I is a schematic diagram illustrating the control component corresponding to the device identifier according to another exemplary embodiment.

When the user selects a controlled device which has a plurality of control functions, the control device may display an additional page to specially display the control component of the controlled device. Referring to FIG. 3I, FIG. 3I is a schematic diagram illustrating the control component corresponding to the device identifier according to another exemplary embodiment. When the control component 40 corresponding to the air conditioner 140 is triggered, the control device may display a control interface 50 corresponding to the air conditioner 140. For example, when the user triggers "heating" control component 60 in the control interface 50, the control device may transmit a mode switch instruction to the air conditioner 140, and the mode switch instruction may be used to control the air conditioner 140 to switch the current operational mode to "heating" mode. For example, when the user triggers control component "–" 70 in the control interface 50, the control device may transmit a temperature regulation instruction to the air conditioner 140, and the temperature regulation instruction may be used to control the air conditioner 140 to lower the current operational temperature.

As described above, the method for controlling a device provided by the first aspect of the embodiments of the present disclosure may receive the identifier display instruction via the lock screen of the control device, display the acquired device identifier of each controlled device on the lock screen, and transmit the control instruction to the controlled device corresponding to a selected device identifier after the selected device identifier is determined. Since the user may control the controlled device directly in the lock screen without unlocking the control device, the user avoids controlling the controlled device frequently when the control device is in the lock status. The user can control the controlled device directly in the lock screen without unlocking the control device, and, accordingly, the timeliness and convenience of the user controlling the controlled device are improved.

In the embodiment, the control device may acquire the device identifier of the controlled device bound to the user account from the cloud server, and may acquire the device identifier of the controlled device connected with the router from the connected router.

In the embodiment, the control device may display the each device identifier acquired from the router and the cloud sever in different groups so as to facilitate the user to distinguish the acquisition way of the each device identifier.

In the embodiment, when the control device acquires the controlled device from the router and the cloud server, it is desired to perform duplication removing operation to the acquired same controlled devices and retain one of them.

In the embodiment, before transmitting the control instruction to the selected controlled device, the control device should determine whether the controlled device is in the same local area network with the control device so as to select the transmitting path of the control instruction.

The following is the device in the embodiments of the present disclosure which may be used to perform the method in the embodiments of the present disclosure. The details which may not be disclosed in the device in the embodiments of the present disclosure can be referred to the method in the embodiments of the present disclosure.

Figure 4A:
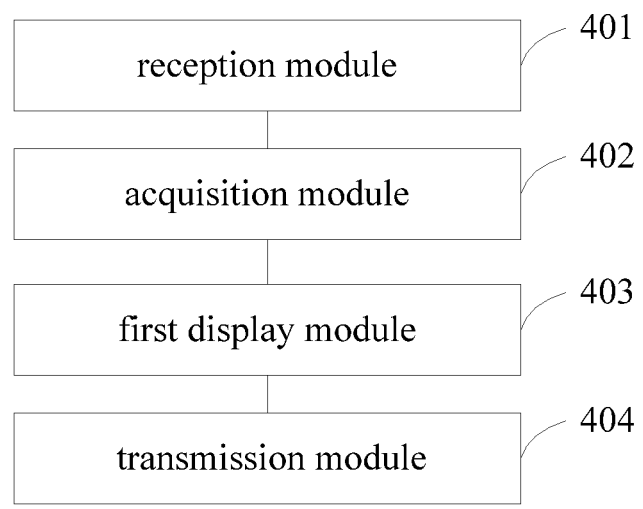
FIG. 4A is a block diagram illustrating a device for controlling a device according to an exemplary embodiment.

FIG. 4A is a block diagram illustrating a device for controlling a device according to an exemplary embodiment. As shown in FIG. 4, the device for controlling a device may be applied into the control device 110, and the device for controlling a device may include but not limited to a reception module 401, an acquisition module 402, a first display module 403, and a transmission module 404. The reception module 401 may be configured to receive an identifier display instruction, and the identifier displaying instruction may be generated when a lock screen of the control device is touched along a predetermined path. The acquisition module 402 may be configured to acquire a device identifier of a corresponding controlled device according to log-in status of a user account on the control device. The first display module 403 may be configured to display the acquired device identifier of each controlled device on the lock screen. The transmission module 404 may be configured to transmit a control instruction to a controlled device corresponding to a selected device identifier after the selected device identifier displayed by the first display module 403 is determined.

Figure 4B:
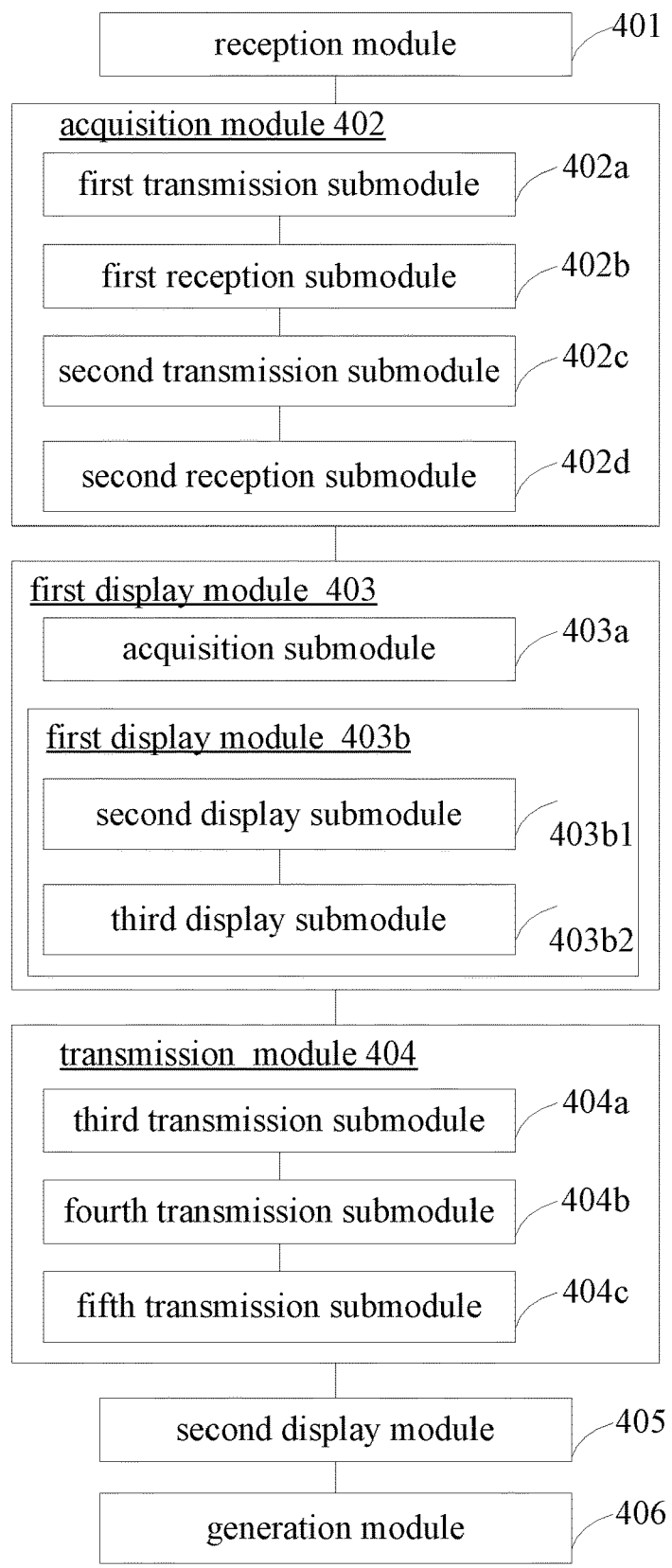
FIG. 4B is a block diagram illustrating a device for controlling a device according to another exemplary embodiment.

In a possible implementation, FIG. 4B is a block diagram illustrating a device for controlling a device according to another exemplary embodiment. As shown in FIG. 4B, the acquisition module 402 may include a first transmission submodule 402a, a first reception submodule 402b, a second transmission submodule 402c, and a second reception submodule 402d. The first transmission submodule 402a may be configured to transmit a first request for acquiring an identifier to a router connected to the control device. The first reception submodule 402b may be configured to receive the device identifier fed back by the router. The second transmission submodule 402c may be configured to transmit, if the user account has logged-in on the control device, a second request for acquiring an identifier to a cloud sever. The second reception submodule 402d may be configured to receive the device identifier fed back by the cloud sever.

In a possible implementation, referring to FIG. 4B, the first display module 403 may include an acquisition submodule 403a and a first display submodule 403b. The acquisition submodule 403a may be configured to display, if only the device identifier fed back by the router is received, the acquired each device identifier on the lock screen. The first display submodule 403b may be configured to display, if the device identifier fed back by the router and the device identifier fed back by the cloud sever are received, the each device identifier acquired from the router and the cloud sever on the lock screen, and the displayed each device identifier may be different from each other.

In a possible implementation, referring to FIG. 4B, the first display submodule 403b may include a second display submodule 403b1 and a third display submodule 403b2. The second display submodule 403b1 may be configured to display the each device identifier acquired from the cloud sever in a first group. The third display submodule 403b2 may be configured to display the device identifier acquired from the router and not displayed in the first group in a second group, and the first group may be different from the second group.

In a possible implementation, referring to FIG. 4B, the device may further include a second display module 405 and a generation module 406. The second display module 405 may be configured to display at least one control component corresponding to the selected device identifier after the selected device identifier is determined. The generation module 406 may be configured to generate, after one control component of the at least one control component displayed by the second display module 405 is triggered, the control instruction corresponding to the control component.

In a possible implementation, referring to FIG. 4B, the transmission module 404 may include a third transmission submodule 404a, a fourth transmission submodule 404b, and a fifth transmission submodule 404c. The third transmission submodule 404a may be configured to, if the selected controlled device and the control device are in a same local area network, establish a connection with the controlled device and transmit the control instruction to the controlled device according to the established connection. The fourth transmission submodule 404b may be configured to transmit to a router connected to the control device the control instruction which is then forwarded to the controlled device by the router. The fifth transmission submodule 404c may be configured to, if the selected controlled device and the control device are not in the same local area network, transmit to a cloud sever the control instruction which is then forwarded to the controlled device by the cloud sever.

As described above, the device for controlling a device provided by the first aspect of the embodiments of the present disclosure may receive the identifier display instruction via the lock screen of the control device, display the acquired device identifier of each controlled device on the lock screen, and transmit the control instruction to the controlled device corresponding to a selected device identifier after the selected device identifier displayed by the first display module 403 is determined. Since the user may control the controlled device directly in the lock screen without unlocking the control device, the user avoids controlling the controlled device frequently when the control device is in the lock status. The user can control the controlled device directly in the lock screen without unlocking the control device, and, accordingly, the timeliness and convenience of the user controlling the controlled device are improved.

In the embodiment, the control device may acquire the device identifier of the controlled device bound to the user account from the cloud server, and may acquire the device identifier of the controlled device connected with the router from the connected router.

In the embodiment, the control device may display the each device identifier acquired from the router and the cloud sever in different groups so as to facilitate the user to distinguish the acquisition way of the each device identifier.

In the embodiment, when the control device acquires the controlled device from the router and the cloud server, it is desired to perform a duplication removing operation to the acquired same controlled devices and retain one of them.

In the embodiment, before transmitting the control instruction to the selected controlled device, the control device should determine whether the controlled device is in the same local area network with the control device so as to select the transmitting path of the control instruction.

With respect to the device in the above embodiments, the specific manners for performing operations for individual modules therein have been described in detail in the embodiments regarding the method, which will not be elaborated herein.

The embodiments of the present disclosure provide a device for controlling a device, the device may implement the method provided by the present disclosure, and the device for controlling a device comprise: a processor; a memory for storing processor-executable instructions; wherein the processor is configured to: receive an identifier display instruction, the identifier displaying instruction being generated when a lock screen of the control device is touched along a predetermined path; acquire a device identifier of a corresponding controlled device according to log-in status of a user account on the control device; display the acquired device identifier of each controlled device on the lock screen; transmit a control instruction to a controlled device corresponding to a selected device identifier after the selected device identifier is determined.

Figure 5:
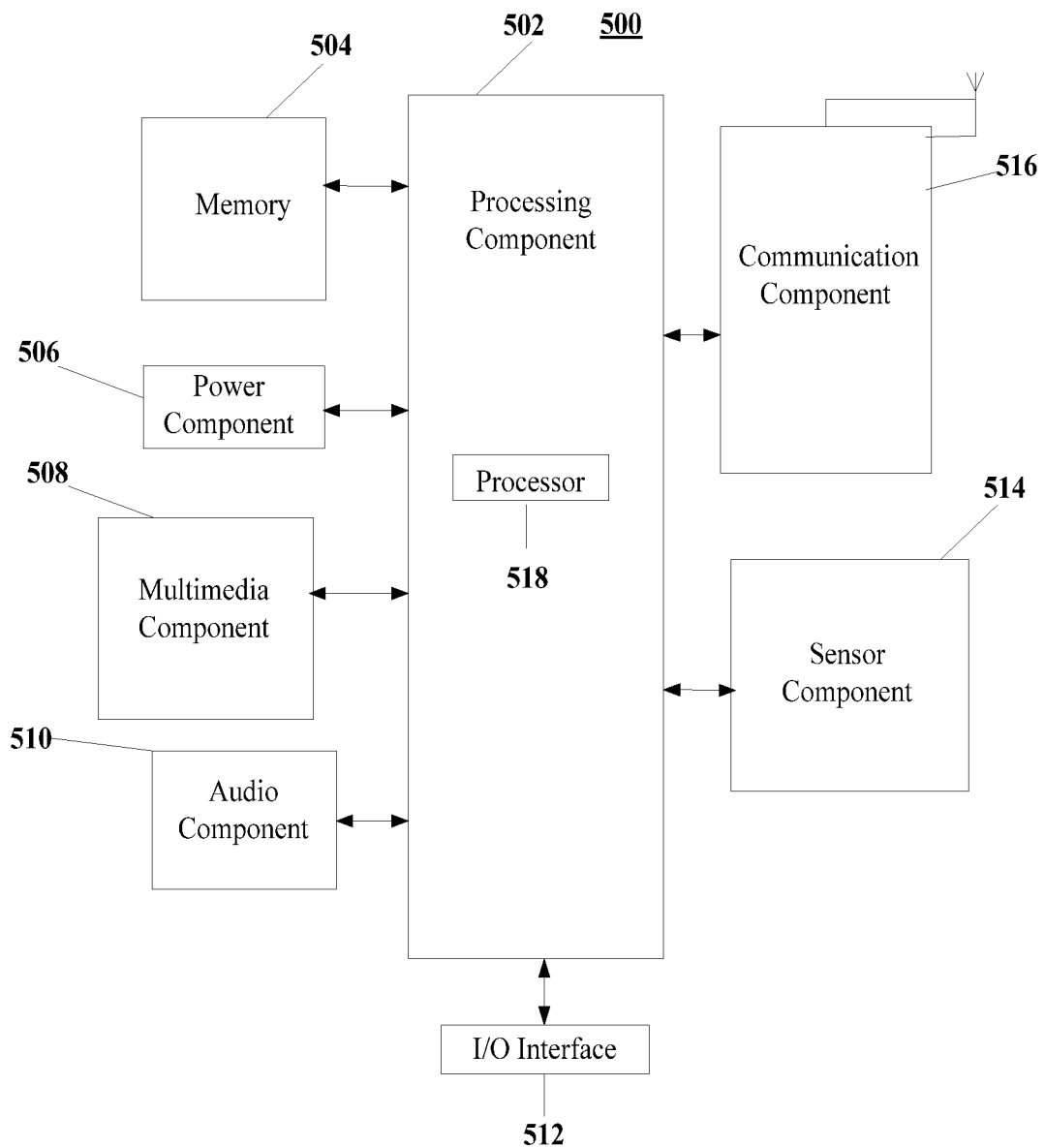
FIG. 5 is a block diagram illustrating a device for controlling a device according to an exemplary embodiment.

FIG. 5 is a block diagram illustrating a device for controlling a device according to an exemplary embodiment. For example, the device 500 may be configured as a control device, the control device may be a mobile phone, a computer, a digital broadcast terminal, a messaging device, a gaming console, a tablet, a medical device, an exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, data communications, and recording operations. The processing component 502 may include one or more processors 518 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, environmental states, times, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 510 is configured to output and/or input audio signals. For example, the audio component 510 includes a microphone ("MIC") configured to receive an external audio signal when the device 500 is in an operation mode, such as a recording mode and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G or 3G or a combination thereof In one example embodiment, the communication component 516 receives a broadcast signal or broadcast associated information from an external broadcast management system via a broadcast channel. In one example embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In example embodiments, there is also provided a non-transitory computer readable storage medium including instructions, such as included in the memory 504, executable by the processor 518 in the device 500, for performing the above-described methods. For example, the non-transitory computer-readable storage medium may be a ROM, a random access memory (RAM), a CD-ROM, a magnetic tape, a floppy disc, an optical data storage device, and the like.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and embodiments be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling a device, applied to a control device, the method comprising:
   receiving an identifier display instruction, the identifier displaying instruction being generated when a lock screen of the control device is touched along a predetermined path;
   acquiring a device identifier of a corresponding controlled device according to log-in status of a user account on the control device, wherein acquiring a device identifier of a corresponding controlled device according to log-in status of a user account on the control device comprises:
      transmitting a first request for acquiring an identifier to a router connected to the control device, the first request for acquiring an identifier being used to trigger the router to feed back a device identifier of each controlled device connected to the router;
      receiving the device identifier fed back by the router;
      transmitting a second request for acquiring an identifier to a cloud server if the user account has logged-in on the control device, the second request for acquiring an identifier being used to trigger the cloud server to feed back a device identifier of each controlled device bound to the user account; and
      receiving the device identifier fed back by the cloud server;
   performing a duplication removing operation to the device identifier fed back by the router and the device identifier fed back by the cloud server;
   displaying, after the duplication removing operation, the acquired device identifier of each controlled device on the lock screen; and
   transmitting a control instruction to a controlled device corresponding to a selected device identifier after the selected device identifier is determined.

2. The method of claim 1, wherein the displaying the acquired device identifier of each controlled device on the lock screen comprises:
   displaying the acquired each device identifier on the lock screen if only the device identifier fed back by the router is received.

3. The method of claim 1, wherein the displaying the acquired device identifier of each controlled device on the lock screen comprises:
   displaying the each device identifier acquired from the router and the cloud server on the lock screen if the device identifier fed back by the router and the device identifier fed back by the cloud server are received, the displayed each device identifier being different from each other.

4. The method of claim 3, wherein the displaying the each device identifier acquired from the router and the cloud server on the lock screen comprises:
   displaying the each device identifier acquired from the cloud server in a first group;
   displaying the device identifier acquired from the router and not displayed in the first group in a second group, the first group being different from the second group.

5. The method of claim 1, further comprising:
   displaying at least one control component corresponding to the selected device identifier after the selected device identifier is determined;
   generating the control instruction corresponding to the control component after one control component of the at least one control component is triggered.

6. The method of claim 1, wherein the transmitting a control instruction to a controlled device corresponding to the selected device identifier comprises:
   establishing a connection with the controlled device and transmitting the control instruction to the controlled device according to the established connection if the selected controlled device and the control device are in a same local area network.

7. The method of claim 1, wherein the transmitting a control instruction to a controlled device corresponding to the selected device identifier comprises:
   transmitting to a router connected to the control device the control instruction which is then forwarded to the controlled device by the router if the selected controlled device and the control device are in a same local area network.

8. The method of claim 1, wherein the transmitting a control instruction to a controlled device corresponding to the device identifier comprises:
   transmitting to a cloud server the control instruction which is then forwarded to the controlled device by the cloud server if the selected controlled device and the control device are not in the same local area network.

9. A device for controlling a device, applied into a control device, the device comprising:
   a processor;
   a memory for storing processor-executable instructions;
   wherein the processor is configured to:
   receive an identifier display instruction, the identifier displaying instruction being generated when a lock screen of the control device is touched along a predetermined path;
   acquire a device identifier of a corresponding controlled device according to log-in status of a user account on the control device, wherein when acquiring a device identifier of a corresponding controlled device according to log-in status of a user account on the control device, the processor is further configured to:
      transmit a first request for acquiring an identifier to a router connected to the control device, the first request for acquiring an identifier being used to trigger the router to feed back a device identifier of each controlled device connected to the router;
      receive the device identifier fed back by the router;
      transmit a second request for acquiring an identifier to a cloud server if the user account has logged-in on the control device, the second request for acquiring an identifier being used to trigger the cloud server to feed back a device identifier of each controlled device bound to the user account; and
      receive the device identifier fed back by the cloud server;

performing a duplication removing operation to the device identifier fed back by the router and the device identifier fed back by the cloud server;

display, after the duplication removing operation, the acquired device identifier of each controlled device on the lock screen; and transmit a control instruction to a controlled device corresponding to a selected device identifier after the selected device identifier is determined.

10. The device of claim 9, wherein the processor configured to display is further configured to:

display the acquired each device identifier on the lock screen if only the device identifier fed back by the router is received.

11. The device of claim 9, wherein the processor configured to display is further configured to:

display the each device identifier acquired from the router and the cloud server on the lock screen if the device identifier fed back by the router and the device identifier fed back by the cloud server are received, the displayed each device identifier being different from each other.

12. The device of claim 11, wherein the processor configured to display the each device identifier acquired from the router and the cloud server on the lock screen is further configured to:

display the each device identifier acquired from the cloud server in a first group;

display the device identifier acquired from the router and not displayed in the first group in a second group, the first group being different from the second group.

13. The device of claim 9, wherein the processor is further configured to:

display at least one control component corresponding to the selected device identifier after the selected device identifier is determined;

generate the control instruction corresponding to the control component after one control component of the at least one control component is triggered.

14. The device of claim 9, wherein the processor configured to transmit is further configured to:

establish a connection with the controlled device and transmit the control instruction to the controlled device according to the established connection if the selected controlled device and the control device are in a same local area network.

15. The device of claim 9, wherein the processor configured to transmit is further configured to:

transmit to a router connected to the control device the control instruction which is then forwarded to the controlled device by the router if the selected controlled device and the control device are in a same local area network.

16. The device of claim 9, wherein the processor configured to transmit is further configured to:

transmit to a cloud server the control instruction which is then forwarded to the controlled device by the cloud server if the selected controlled device and the control device are not in the same local area network.

17. A non-transitory computer-readable medium readable by a computer and storing a computer program including instructions for executing the steps of a method for controlling a device, the method comprising:

receiving an identifier display instruction, the identifier displaying instruction being generated when a lock screen of the control device is touched along a predetermined path;

acquiring a device identifier of a corresponding controlled device according to log-in status of a user account on the control device, wherein acquiring a device identifier of a corresponding controlled device according to log-in status of a user account on the control device comprises:

transmitting a first request for acquiring an identifier to a router connected to the control device, the first request for acquiring an identifier being used to trigger the router to feed back a device identifier of each controlled device connected to the router;

receiving the device identifier fed back by the router;

transmitting a second request for acquiring an identifier to a cloud server if the user account has logged-in on the control device, the second request for acquiring an identifier being used to trigger the cloud server to feed back a device identifier of each controlled device bound to the user account; and receiving the device identifier fed back by the cloud server;

performing a duplication removing operation to the device identifier fed back by the router and the device identifier fed back by the cloud server;

displaying, after the duplication removing operation, the acquired device identifier of each controlled device on the lock screen; and transmitting a control instruction to a controlled device corresponding to a selected device identifier after the selected device identifier is determined.

\* \* \* \* \*